(12) United States Patent
Kim

(10) Patent No.: US 10,964,115 B2
(45) Date of Patent: Mar. 30, 2021

(54) SOUND REPRODUCTION APPARATUS FOR REPRODUCING VIRTUAL SPEAKER BASED ON IMAGE INFORMATION

(71) Applicant: SQAND CO. LTD., Yuseong-gu Daejeon (KR)

(72) Inventor: Yang-Hann Kim, Yuseong-gu Daejeon (KR)

(73) Assignee: SQAND CO. LTD.

( * ) Notice: Subject to any disclaimer, the term of this patent is extended or adjusted under 35 U.S.C. 154(b) by 0 days.

(21) Appl. No.: 16/500,943

(22) PCT Filed: Apr. 5, 2018

(86) PCT No.: PCT/KR2018/004008
§ 371 (c)(1),
(2) Date: Oct. 4, 2019

(87) PCT Pub. No.: WO2018/186693
PCT Pub. Date: Oct. 11, 2018

(65) Prior Publication Data
US 2020/0111257 A1    Apr. 9, 2020

(30) Foreign Application Priority Data

Apr. 5, 2017    (KR) .................. 10-2017-0044181

(51) Int. Cl.
*G06T 19/00*    (2011.01)
*G02B 27/01*    (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ..... G06T 19/006; G02B 27/017; G06F 3/011; G06K 9/00201; H04R 2420/01; H04R 2420/07; H04R 2400/11
See application file for complete search history.

(56) References Cited

U.S. PATENT DOCUMENTS 5,633,993 A  *  5/1997  Redmann ................ G06F 3/011
                                                       345/419
10,038,966 B1 *  7/2018  Mehra ................ G06K 9/00362
(Continued)

FOREIGN PATENT DOCUMENTS

JP        2014-116722 A     6/2014
KR    10-2014-0128306 A    11/2014
(Continued)

OTHER PUBLICATIONS

International Search Report from PCT/KR2018/004008, dated Aug. 21, 2018, pp. 1-4.

*Primary Examiner* — King Y Poon
*Assistant Examiner* — Vincent Peren
(74) *Attorney, Agent, or Firm* — The Belles Group, P.C.

(57) ABSTRACT

A sound source reproducing device which communicates with an electronic device providing images and original sound may be provided. The sound source reproducing device includes: an interface which receives position information of at least one virtual object included in the image and the original sound from the electronic device; and a controller which generates virtual speaker position information corresponding to the position information of the at least one virtual object received from the interface, and converts the original sound received from the interface into a sound source signal for a plurality of speakers on the basis of the virtual speaker position information.

14 Claims, 10 Drawing Sheets

(51) Int. Cl.
*G06F 3/01* (2006.01)
*G06K 9/00* (2006.01)

(52) U.S. Cl.
CPC ...... *G06K 9/00201* (2013.01); *H04R 2420/01* (2013.01); *H04R 2420/07* (2013.01); *H04S 2400/11* (2013.01)

(56) References Cited

U.S. PATENT DOCUMENTS

| | | | |
|---|---|---|---|
| 2002/0034307 A1* | 3/2002 | Kubota | G10H 1/0091 381/17 |
| 2007/0274528 A1* | 11/2007 | Nakamoto | H04S 7/30 381/17 |
| 2012/0081393 A1* | 4/2012 | Kim | G06F 3/011 345/633 |
| 2016/0119731 A1 | 4/2016 | Lester, III | |
| 2016/0212538 A1* | 7/2016 | Fullam | H04R 29/001 |

FOREIGN PATENT DOCUMENTS

KR   10-2014-0129654 A   11/2014
WO   WO 2016001909 A1   1/2016

\* cited by examiner

SOUND REPRODUCTION APPARATUS FOR REPRODUCING VIRTUAL SPEAKER BASED ON IMAGE INFORMATION

CROSS-REFERENCE TO RELATED PATENT APPLICATIONS

The present application is a U.S. national stage application under 35 U.S.C. § 371 of PCT Application No. PCT/KR2018/004008, filed Apr. 5, 2018, which claims priority to Korean Patent Application No. 10-2017-0044181, filed Apr. 5, 2017. The disclosures of the aforementioned priority applications are incorporated herein by reference in their entireties.

TECHNICAL FIELD

The present disclosure relates to a sound source reproducing device and more particularly to a sound source reproducing device which communicates with an electronic device providing images and original sound, in order to reproduce a virtual speaker.

BACKGROUND ART

Augmented reality (AR) that is the latest technology trend in various fields such as broadcast, education, medical treatment, manufacture, publication, game, etc., is a derivative of virtual reality and combines real world and virtual world. According to the virtual reality, a real world environment is built into the virtual world by means of a computer environment and people are immersed in the virtual reality, thereby implementing interaction between human and computers. According to the augmented reality, additional information generated by using a computer model is projected on and interacted with real world information, so that people can more realistically experience a variety of digital information about the real world In such an augment reality or virtual reality, a sound source as well as 3D images can be reproduced.

However, according to a sound source system that is implemented in a conventional virtual reality or augment reality, there is a disadvantage in that it is difficult to determine the correct position of the sound source. In this case, since only the feeling of the position of the sound source is transmitted, there is a requirement that the correct position of the reproduced sound source is determined and provided to a user.

Also, when the reproduced sound source is intended to be listened to by wearing a head mount display (HMD), a sound source reproducing device mounted within the HMD makes the HMD heavier and the user feel uncomfortable. Therefore, for the purpose of solving such a problem, the sound source needs to be reproduced through a plurality of speakers located outside the HMD.

DISCLOSURE

Technical Problem

According to the embodiment of the present invention, the sound source reproducing device generates the virtual speaker position information by making reference to the position of the virtual object received from the electronic device, and converts hereby the original sound to be reproduced in a speaker, so that the original sound is reproduced at the position of the virtual object.

According to the embodiment of the present invention, the virtual speaker is reproduced depending on the position of the virtual object. Therefore, it is possible to easily reproduce the sound source toward the listening subject even though the listening subject does not perform a separate operation.

Also, through a plurality of the sound source reproducing device, it is possible to reproduce the sound source more effectively focusing on a user.

Technical Solution

One embodiment is a sound source reproducing device which communicates with an electronic device providing images and original sound. The sound source reproducing device includes: an interface which receives position information of at least one virtual object included in the image and the original sound from the electronic device; and a controller which generates virtual speaker position information corresponding to the position information of the at least one virtual object received from the interface, and converts the original sound received from the interface into a sound source signal for a plurality of speakers on the basis of the virtual speaker position information.

The image comprises a preview image based on augmented reality, and wherein the at least one virtual object, together with the preview image, is displayed on the preview image on the electronic device.

The sound source reproducing device further comprises a memory, wherein the position information of the at least one virtual object comprises moving path information on the preview image, wherein the moving path information is stored in advance in the memory, and wherein the controller generates the virtual speaker position information by making reference to the moving path information stored in advance in the memory.

The sound source reproducing device further comprises a speaker unit comprising the plurality of speakers, wherein the controller outputs the sound source signal for the plurality of speakers to the speaker unit.

The controller converts the original sound into the sound source signal which allows the sound sounds as if sound is reproduced at a position of the virtual speaker by using a transfer function between the sound source signal input to each speaker and a sound pressure output from the position of each virtual speaker.

The controller calculates a coefficient for converting the original sound in order that the sound sounds as if the sound is reproduced at the position of the virtual speaker by using the transfer function, and converts the original sound into the sound source signal by filtering the original sound by using the coefficient.

The transfer function for the position of at least a portion of the virtual speaker is stored in advance in the memory.

The virtual speaker position information corresponding to at least a portion of the position information of the at least one virtual object is stored in the memory.

The electronic device is a head mounted display.

Another embodiment is a sound source reproducing device including: a memory which stores original sound and images including at least one virtual object; and a controller which generates virtual speaker position information corresponding to position information of the at least one virtual object, and converts the original sound into a sound source signal for a plurality of speakers on the basis of the virtual speaker position information. The controller transmits the image including the at least one virtual object to the electronic device.

Advantageous Effects

According to the embodiment of the present invention, the virtual speaker is reproduced depending on the position of the virtual object. Therefore, it is possible to easily reproduce the sound source toward the listening subject even though the listening subject does not perform a separate operation.

Also, through a plurality of the sound source reproducing device, it is possible to reproduce the sound source more effectively focusing on a user.

Also, the sound source reproducing device 100 generates the virtual speaker position information by making reference to the position of the virtual object stored previously in the electronic device 200, so that the virtual speaker can be reproduced at a correct position of the virtual object.

Also, since the sound source is reproduced through separate multiple speakers, inconvenience caused by wearing a head mounted display can be overcome.

MODE FOR INVENTION

Figure 1A:
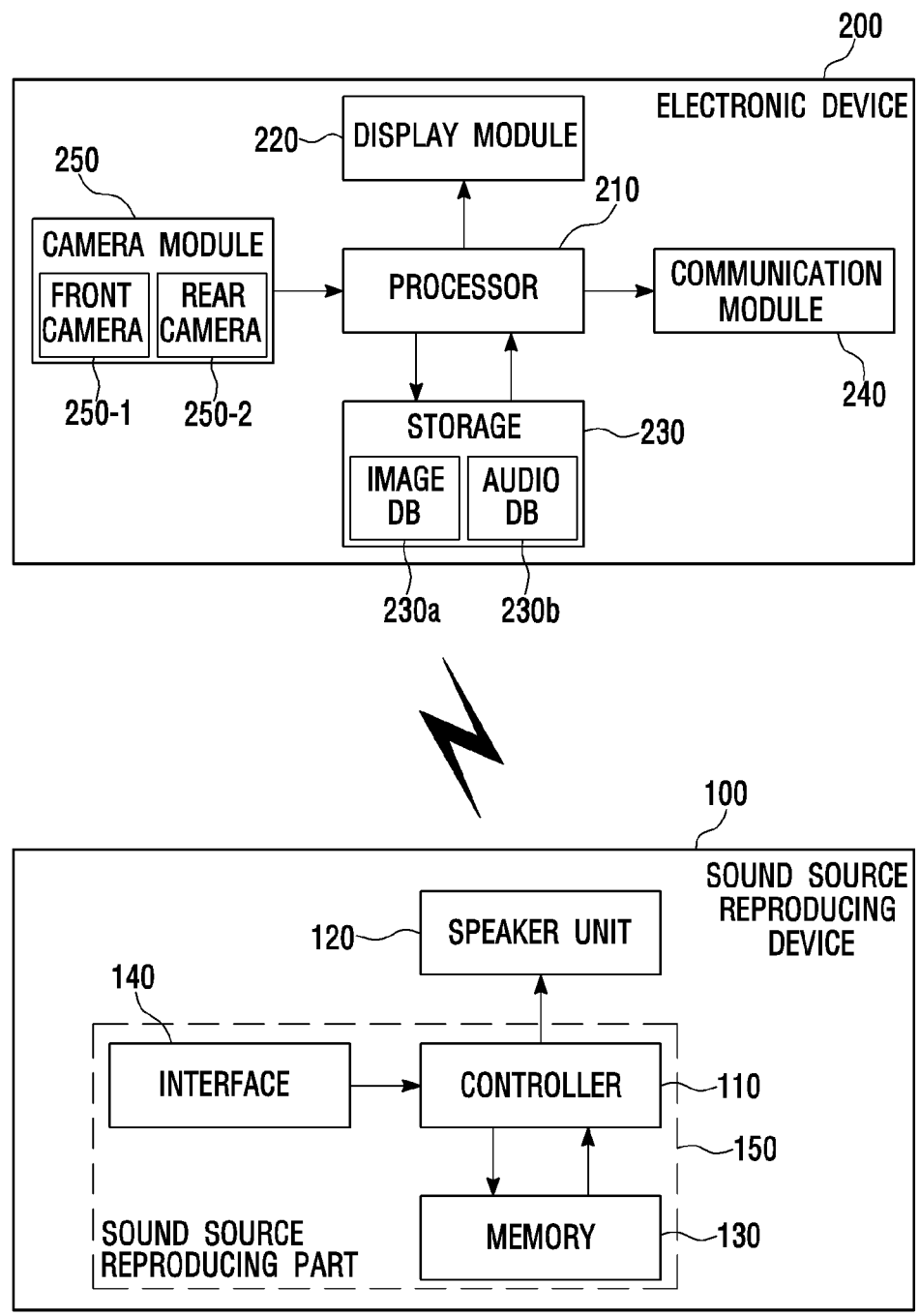
FIG. 1a is a block diagram for describing configurations of an electronic device 200 and a sound source reproducing device 100 according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a sound source reproducing device 100 and an electronic device 200 according to an embodiment of the present invention will be described with reference to the accompanying drawings.

FIG. 1a is a block diagram for describing configurations of the electronic device 200 and the sound source reproducing device 100 according to the embodiment of the present invention.

As shown in FIG. 1a, the electronic device 200 may include a processor 210, a display module 220, a storage 230, a communication module 240, and a camera module 250.

The camera module 250 may include a front camera 250-1 and a rear camera 250-2 and may capture images (still images or video). In particular, the camera module 250 of the embodiment of the present invention may capture a face image of a user by using an eye tracking function and may transmit the captured images to the processor 210.

The front camera 250-1 may be provided at a position which allows the capturing of a face of a user when the user views the front side of the display module 220, and the rear camera 250-2 may be provided at a position which allows the capturing of the background image that the user views from the rear side of the front camera 250-1 when the user views the front side of the display module 220.

The processor 210 may execute an operating system or application programs thereby controlling multiple hardware or software components connected to the processor 210, processing various data including multimedia data and performing operations.

Figure 4:
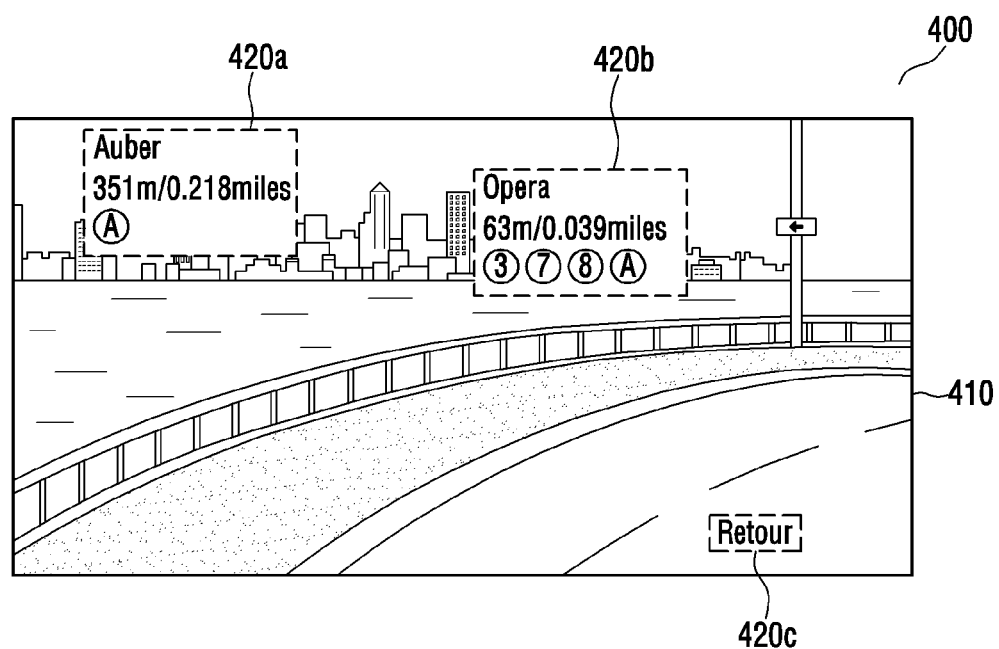
FIGS. 4 and 5 are views of a preview image 410 which is displayed on a display module 220 of the electronic device 200 and of position information of a virtual object 420.

The processor 210 generates a preview image 410 based on the augmented reality, for example, an image shown in FIG. 4, or a background image based on the virtual reality and transmits the image to the display module 220. The display module 220 displays the generated preview image 410. The processor 210 creates one or more virtual objects 420a and 420b to be displayed together with the preview image 410 displayed on the display module 220. The processor 210 may generate position information of the virtual object 420 displayed on the preview image 410. In the embodiment, the displayed image may be a three-dimensional image which has depth information or is composed of a binocular image. In the embodiment, the preview image is a game image and the virtual object may be a character in a game or may be an object that generates sound, such as an explosive, an automobile, etc.

In order to reproduce the sound source, the processor 210 may determine whether to receive from an external device (e.g., the sound source reproducing device 100) a request for transmission of the position information of the created virtual object 420. If the processor 210 receives the request for transmission of the position information of the virtual object 420, the processor 210 may transmit the position information of the virtual object 420 to the storage 230. The storage 230 may store the position information in an image DB 230a. Meanwhile, it is possible to configure to transmit both the original sound and the position information regardless of the request for transmission of the position information of the virtual object 420. The processor 210 may read the original sound stored already in the storage 230 and the moving path information of the virtual object 420 and may transmit the read moving path information and the original sound to the communication module 240. The original sound may be sound generated by the virtual object such as voice of a character, sound generated from an object, or may be a multi-channel audio signal such as stereo sound.

The display module 220 may display a command processing result of the processor 210 and may display the virtual object 420 and the preview image received from the processor 210. The display module 220 may include a touch screen, a hologram device, a projector, etc., in accordance with the embodiment. For example, the touch screen may be a liquid-crystal display (LCD), an active-matrix organic light-emitting diode (AMOLED), etc., and may be implemented to be flexible, transparent, or wearable. The hologram device may show a stereoscopic image in the air by using interference of light. The projector may display an image by projecting light onto a screen. Also, the display module 220 may be implemented as an independent display device separated from the electronic device 200, such as a head mounted display (HMD), a separate monitor, a TV, etc., or may be implemented to be connected by wire or wirelessly to the electronic device 200 to receive image signals.

The storage 230 stores commands processed or to be processed by the electronic device 200. The storage 230 may include an audio DB 230b related to the original sound and the image DB 230a related to the image data. The original sound may be generated in the electronic device 200 or may be received from a content providing device (not shown) and stored in advance in the storage 230. When the processor 210 receives from the sound source reproducing device 100 the request for transmission of the position information of the virtual object 420, the processor 210 may transmit the position information of the virtual object 420 to the storage 230. The storage 230 may store the position information in the image DB 230a.

The communication module 240 may mediate the data communication between the electronic device 200 and the sound source reproducing device 100 and may transmit the original sound of the electronic device 200 and the information on the image data to the sound source reproducing device 100. Alternatively, the communication module 240 may receive from the sound source reproducing device 100 the request for transmission of the position information of the virtual object 420 or may transmit the position information of the virtual object 420 stored in the storage 230 to the sound source reproducing device 100. For example, the communication module 240 may allow the transmission and reception of the data through a wired communication method or a short-range wireless communication such as WIFI, Bluetooth, BLE, etc.

In the meantime, the above-described electronic device 200 is able to provide the augmented reality or the virtual reality and may include, in accordance with the embodiment, a smartphone, a tablet personal computer, a mobile phone, a video phone, an e-book reader, a desktop personal computer, a laptop computer, a netbook computer, a personal digital assistant (PDA), a portable multimedia player (PMP), an MP3 player, a mobile medical equipment, a camera, a wearable device (e.g., head mounted device (HMD)) like an electronic glasses, electronic clothes, an electronic bracelet, an electronic necklace, an electronic appcessory, electronic tattoo, or a smart watch), etc.

According to certain embodiments, the electronic device may be a smart home appliance having a function of a camera. The smart home appliance may include a TV, a digital video disk (DVD) player, an audio system, a refrigerator, an air conditioner, a cleaner, an oven, a microwave, a washing machine, an air purifier, a set-top box, etc.

Meanwhile, the sound source reproducing device 100 may include a speaker unit 120 and a sound source reproducing part 150. The sound source reproducing part 150 may include a controller 110, a memory 130, and an interface 140.

Figure 1B:
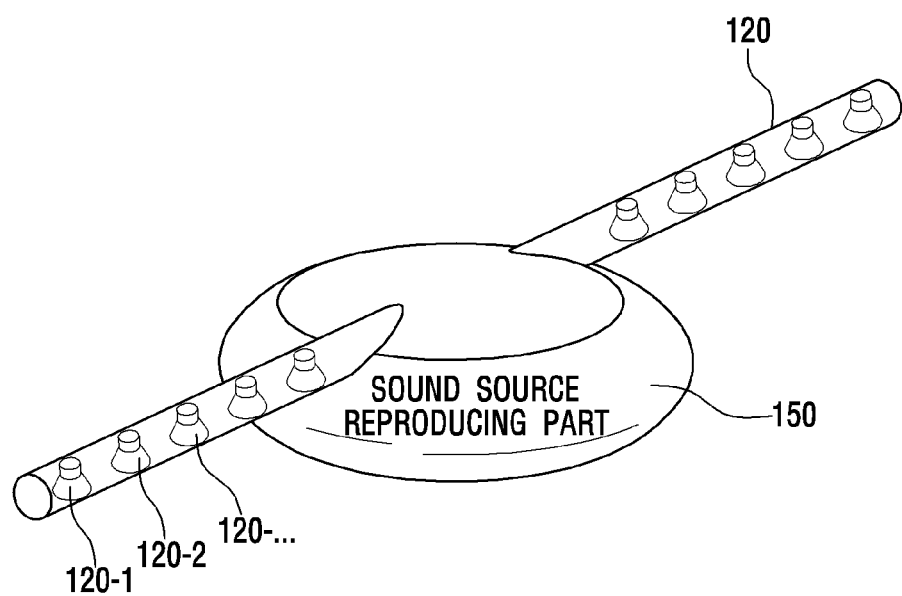
FIG. 1b is a conceptual view of a sound source reproducing part 150 and a speaker unit 120 which are integrally provided.

According to the embodiment, as shown in FIG. 1b, the speaker unit 120 and the sound source reproducing part 150 may be integrally provided or may be provided independently in a separate form.

The controller 110 may process various data including multimedia data for driving the sound source reproducing device 100 and perform operations.

The controller 110 may receive the original sound from the electronic device 200 through the interface 140 and may receive the position information of the virtual object included in the image from the electronic device 200 through the interface 140. The controller 110 may transmit the request for transmission of the position information of the virtual object 420, to the electronic device 200 through the interface 140. The controller 110 may generate virtual speaker position information corresponding to the position information of the virtual object or may control the speaker unit 120 by converting the received original sound such that the received original sound sounds as if it is generated at a position of a virtual speaker 120' designated by the position information of the virtual object.

The memory 130 may store such a sound source signal generated from the original sound received from the electronic device 200 through the interface 140 or store the position information of the virtual object 420. Also, the memory 130 may receive the virtual speaker position information corresponding to the position information of the virtual object from the controller 110 and store it. Also, a function of converting the original sound into the sound source signal as if the sound is generated at a position corresponding to each virtual position (the position of the virtual object) may be stored in the memory 130. Otherwise, a transfer function between the position of each speaker and each virtual point may be stored in the memory 130, and the controller 110 may calculate the function on the basis of the transfer function.

The interface 140 mediates the data transmission and reception with the electronic device 200. The interface 140 receives the original sound or the position information of the virtual object from the electronic device 200 and transmits it to the controller 110. The interface 140 may be a wireless communication interface such as WiFi, Bluetooth, etc., or a wired communication interface such as a wired LAN, USB, HDMI, etc.

The speaker unit 120 is preferably composed of a plurality of speakers and reproduces the sound source signal received from the controller 110 as sound. According to the embodiment, the speaker unit 120 may be purchased separately from the sound source reproducing device 100 and used. Alternatively, the speaker unit 120 may be used in connection with the sound source reproducing device 100.

The sound source reproducing device 100 according to the embodiment of the present invention may have a function of providing the sound source and/or a function of controlling the sound source reproducing device 100, for example, a smartphone, a smart TV, a tablet PC, a PC, etc. The sound source reproducing device 100 may include multiple speakers as shown in FIG. 1b. According to the embodiment, in this case, the sound source reproducing device 100 may be mounted in a conventional smart TV, etc., in the form of a separate physical product. Also, the sound source reproducing device 100 may be configured to be coupled to the electronic device 200 in an add-on type or to be embedded in the electronic device 200.

The scope of the present invention is not limited to the above embodiment in regard to the coupling of the electronic device 200 and the sound source reproducing device 100. Also, all of the components shown in the block diagram of FIG. 1a may be included or may be partially omitted.

Figure 1C:
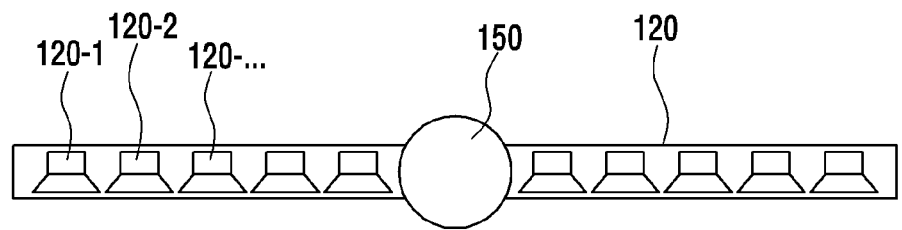
FIG. 1c is a conceptual view of data transmission and reception between the electronic device 200 and the sound source reproducing device 100 in accordance with the embodiment of the present invention.
Figure 1C:
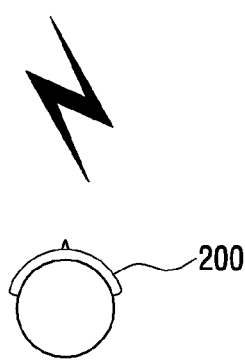

FIG. 1c is a conceptual view showing the data transmission and reception and sound reproduction between the electronic device 200 and the sound source reproducing device 100.

FIG. 1c shows that the user listens to the audio of a corresponding image reproduced by the sound source reproducing device 100 while viewing the image which is being displayed on the head mounted display in a state of wearing the head mounted display type electronic device 200 on his/her head.

As shown in FIG. 1c, the electronic device 200 may transmit the original sound and the virtual object position information to the sound source reproducing device 100 in a 3D space. The sound source reproducing device 100 generates the sound source signal such that the corresponding original sound sounds as if it is generated at the virtual position shown by the virtual object position information in accordance with the received original sound and the virtual object position information, thereby reproducing it through a plurality of speakers 120-1, 120-2, . . . , 120-n.

Figure 5:
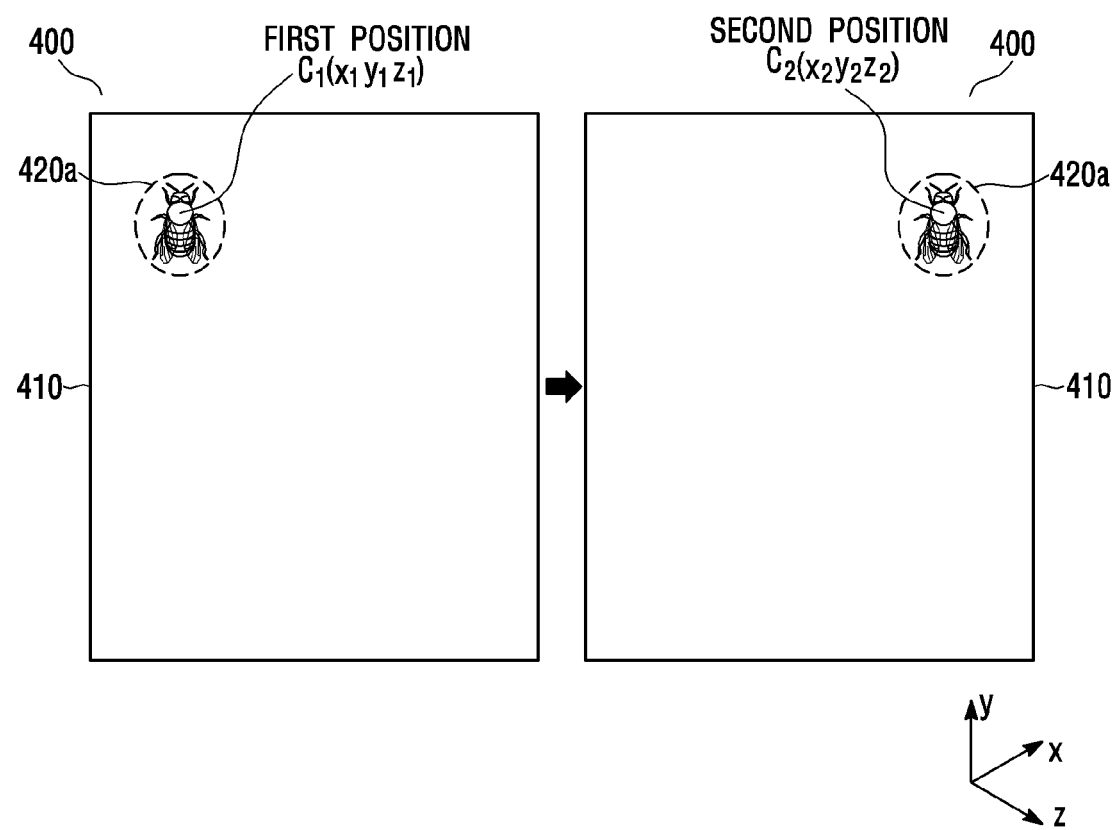
Figure 6:
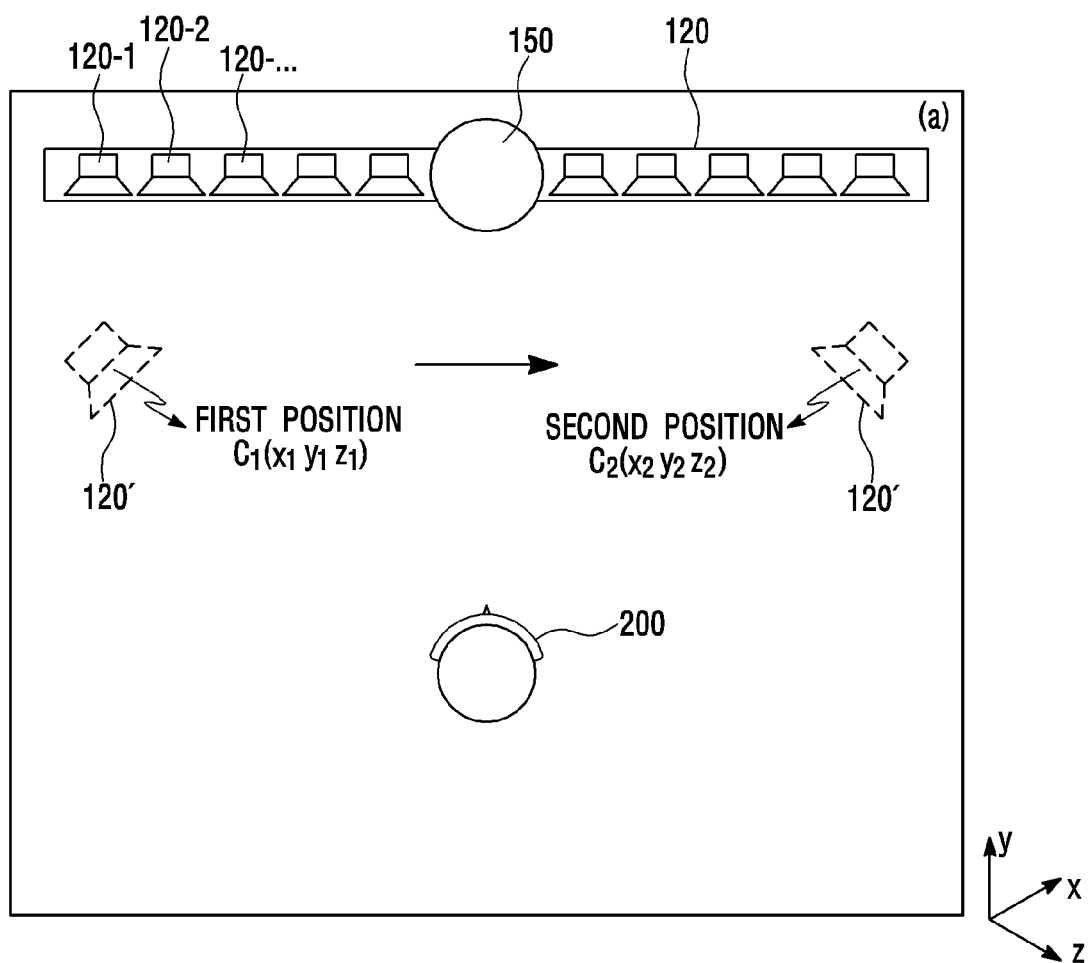
FIGS. 6 and 7 are views of a virtual speaker listening structure of a user of the electronic device 200 through the speaker unit 120 of the sound source reproducing device 100.

FIG. 5 shows an example of the preview image 410 and the position information of the virtual object 420 which are displayed on the display module 220 of the electronic device 200. That is, when the virtual object of a fly 420 moves from a first position to a second position on the displayed screen, the sound source reproducing device 100 converts the fly sound, i.e., the original sound as if the original sound is generated at a position on the moving path of the fly 420a, and reproduces it through the speaker unit 120. In other words, as shown in FIG. 6, the user of the electronic device 200 hears the sound source signal which is reproduced through the plurality of speakers 120-1, 120-2, . . . , 120-n included in the speaker unit 120 of the sound source reproducing device 100 as if the sound is generated while the virtual speaker 120' moves from the first position C1 to the second position C2, that is to say, as if the sound is generated while the fly moves from the first position C1 to the second position C2.

Figure 2:
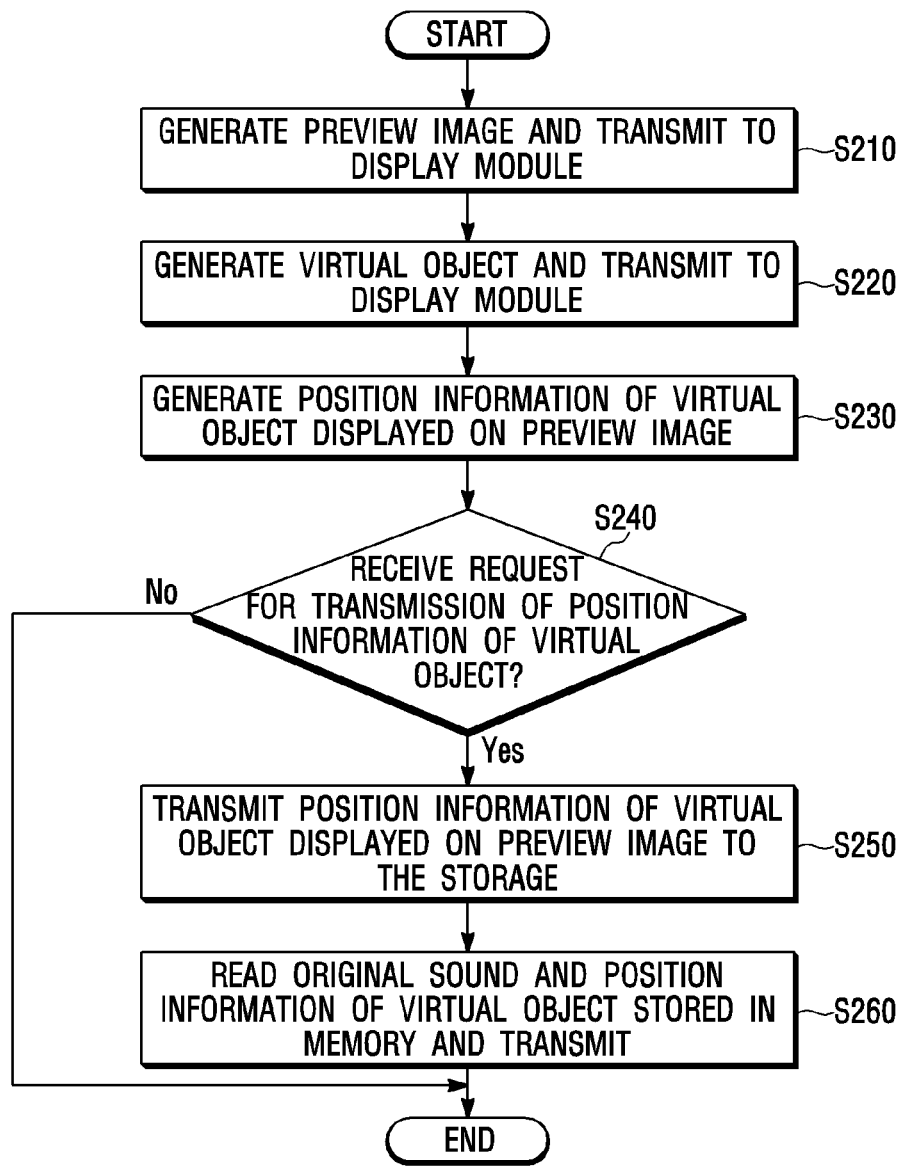
FIG. 2 is a flowchart for describing a method in which the electronic device 200 transmits original sound and information on images to the sound source reproducing device 100 in accordance with the embodiment of the present invention.

FIG. 2 is a flowchart for describing a method in which the electronic device 200 transmits original sound and information on images to the sound source reproducing device 100 while displaying the augmented reality image or the virtual reality image in accordance with the embodiment of the present invention.

As shown in FIG. 2, the processor 210 generates the preview image based on the augmented reality or the background image based on the virtual reality and transmits to the display module 220 (S210), and then the display module 220 displays the generated preview image. The processor 210 according to the embodiment of the present invention may generate the preview image 410 shown in FIG. 4 by using the front camera 250-1 and the rear camera 250-2.

For example, the processor 210 receives the image including the face of the user using the electronic device 200 and calculates the three-dimensional viewpoint of the user, which shows where the user is and which direction the user views in, by using an eye tracking technology from the image including the user's face. The three-dimensional viewpoint may be represented by the rotation, deflection, and up-and-down movement (roll, yaw, and pitch), that is, the relative rotation value of the front camera 250-1 and by displacement values, i.e., the coordinates of x-axis, y-axis, and z-axis of the front camera 250-1.

The processor 210 moves the viewpoint of the rear camera 250-2 such that the calculated three-dimensional viewpoint of the user corresponds to the viewpoint of the rear camera 250-2. That is, on the basis of the three-dimensional viewpoint of the user, i.e., the rotation, deflection, and up-and-down movement (roll, yaw, and pitch) of the front camera 250-1 and the displacement values i.e., the coordinates of x1-axis, y1-axis, and z1-axis, the processor 210 moves the viewpoint of the three-dimensional viewpoint of the rear camera 250-2, i.e., the rotation, deflection, and up-and-down movement (roll, yaw, and pitch) of the rear camera 250-2 and the displacement values i.e., the coordinates of x2-axis, y2-axis, and z2-axis to the three-dimensional viewpoint of the user.

The processor 210 detects an image corresponding to a zone where the viewing angle of the user matches the angle of view of the rear camera 250-2 and then generates the preview image according to the embodiment of the present invention. In other words, the processor 210 calculates a reference angle corresponding from the user to the width of the display module 220. Specifically, the processor 210 calculates the reference angle formed by the intersection of straight lines from both ends of the display module 220 to the user. Then, the processor 210 detects the image of the zone corresponding to the angle of view which is the same as the reference angle on the basis of the viewpoint of the moved rear camera 250-2, among the background images input from the rear camera 250-2, and then generates the preview image according to the embodiment of the present invention. Here, the viewing angle of the user means the viewing angle of a common person.

Meanwhile, such a preview image may be a 2D image or a 3D image.

The processor 210 generates a predetermined virtual object 420 to be displayed together with the preview image 410 displayed on the display module 220 (S220).

The predetermined virtual object 420 may be, as shown in FIG. 4, provided on the augmented reality-based preview image 410 in the form of a menu, an icon, a text, etc. The virtual object 420 may be provided in order to show information on a predetermined portion shown on the preview image 410. Alternatively, the predetermined portion itself shown on the preview image 410 may be provided as the virtual object 420.

For example, as shown in FIG. 4, a tourist attraction 420a around the user, a distance 420b from the user, and transportation information 420c for moving to the tourist attraction may be provided as the virtual object.

In the meantime, the processor 210 may transmit the created virtual object 420 to the display module 220, and the display module 220 may display the created virtual object 420 together with the preview image 410.

The processor 210 may generate the position information of the virtual object 420 displayed on the preview image 410

(S230). The position information of the virtual object 420 may include a spatial coordinate (x, y, z) of the virtual object 420 which is formed in the three-dimensional space that is a listening zone for listening the reproduced sound source. For example, as shown in FIG. 5, the position information of the virtual object 420 may include moving path information on the information on the first position C1 (x1, y1, z1) and the second position C2 (x2, y2, z2) according to the movement of the virtual object 420a from the first position to the second position in the three-dimensional space indicated by the preview image 410.

In order to reproduce the original sound, the processor 210 may determine whether to receive from an external device (e.g., the sound source reproducing device 100) a request for transmission of the position information of the created virtual object 420 (S240). Here, the original sound may be the original sound stored in advance in the audio DB 230b of the storage 230 or the original sound which the electronic device 200 receives from an external device (not shown) in real time. The original sound may be a multi-channel audio signal such as stereo audio.

If the processor 210 receives the request for transmission of the position information of the virtual object 420, the processor 210 may transmit the position information of the virtual object 420 to the storage 230 (S250). The storage 230 may store the position information in the image DB 230a. The processor 210 may read the original sound stored already in the storage 230 and the moving path information of the virtual object 420 and may transmit the read moving path information and the original sound to the communication module 240 (S260). The communication module 240 may transmit the data to the sound source reproducing device 100. The communication module 240 may allow the transmission and reception of the data through a wired communication method or a short-range wireless communication such as WIFI, Bluetooth, BLE, etc.

On the other hand, when the processor 210 does not receive the request for transmission of the position information of the virtual object 420, the above-described process may be terminated. Meanwhile, according to the embodiment, the step 5240 may be omitted.

Figure 3:
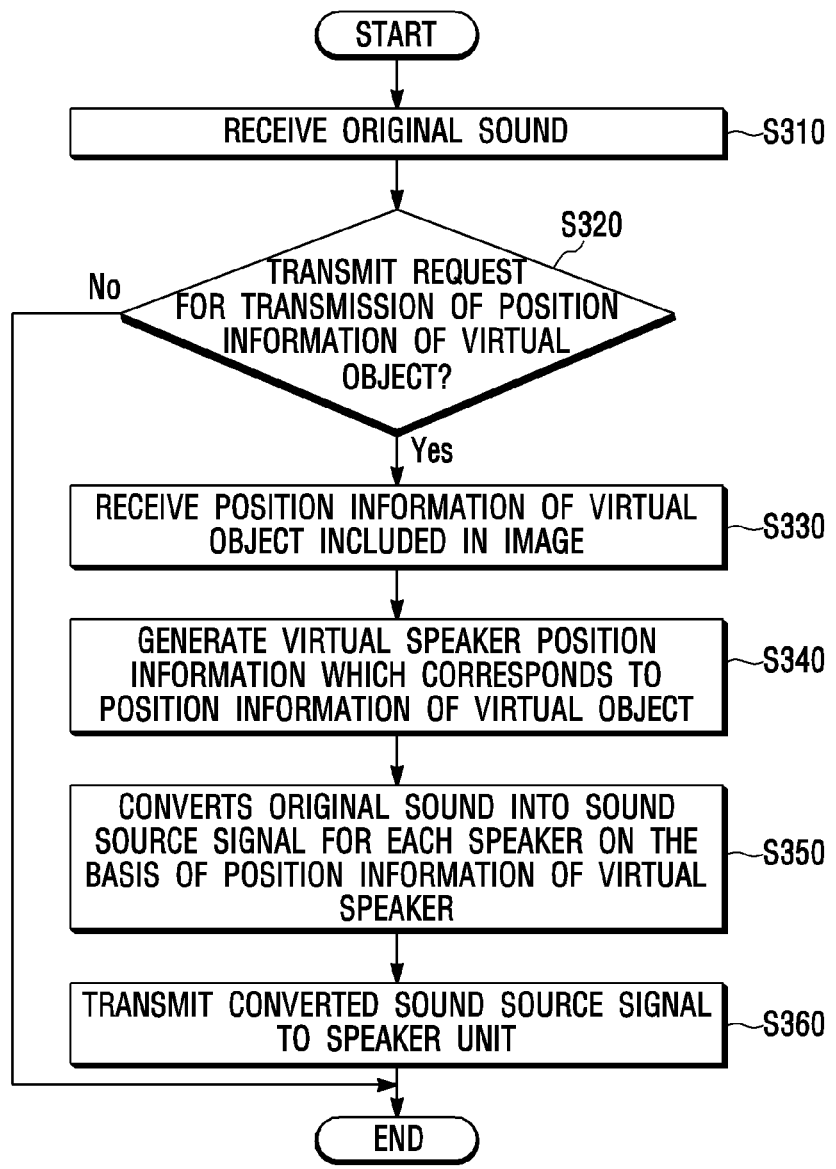
FIG. 3 is a flowchart for describing a method in which the sound source reproducing device 100 receives the original sound and information on images from the electronic device 200 in accordance with the embodiment of the present invention.

FIG. 3 is a flowchart for describing a method in which the sound source reproducing device 100 receives the original sound and information on images from the electronic device 200 in accordance with the embodiment of the present invention.

As shown in FIG. 3, the controller 110 may receive the original sound from the electronic device 200 through the interface 140 (S310). According to the embodiment, the controller 110 may reproduce the original sound stored in the sound source reproducing device 100, and the corresponding original sound may be stored in the memory 130 (not shown).

The controller 110 may transmit the request for transmission of information to be referenced so as to reproduce the original sound, that is to say, the position information of the virtual object 420, to the electronic device 200 through the interface 140 (S320). The controller 110 may receive, through the interface 140, the position information of the virtual object included in the image from the electronic device 200 which has received the corresponding transmission request (S330). According to the embodiment, as shown in FIG. 4, the image may include the preview image 410 and the virtual object 420 which is displayed together with the preview image 410. As shown in FIG. 5 described above, the position information of the virtual object 420 may include moving path information on the information on the first position C1 (x1, y1, z1) and the second position C2 (x2, y2, z2) according to the movement of the virtual object 420a from the first position to the second position in the three-dimensional space indicated by the preview image 410. The moving path information may be stored previously in the electronic device 200. The moving path information that the controller 110 has received from the electronic device 200 may be stored in the memory 130.

The controller 110 may generate the virtual speaker position information, which corresponds to the position information of the virtual object 420 (S340). That is, the position in the space for the augmented reality or virtual reality is mapped to the position in the space where the user listens to the sound. For this, the virtual speaker position information (mapping table) corresponding to at least portion of the position information may be stored in the memory. The controller 110 may generate the virtual speaker position information corresponding to the position information of the virtual object 420 by using the mapping table. Also, the controller 110 may calculate the virtual speaker position information corresponding to the position information of the virtual object 420 by using information on the size of the space in the augmented reality or the virtual reality and the information on the size of the space where the user is located Further, the controller 110 may generate the virtual speaker position information with reference to the moving path information of the virtual object 420 stored already in the memory 130. For example, as shown in FIG. 6, the moving path information of the virtual speaker 120' may include moving path information on the information on the first position C1 (x1, y1, z1) and the second position C2 (x2, y2, z2) according to the movement of the virtual speaker 120' from the first position to the second position in the three-dimensional space indicated by the preview image 410. Also, the generated virtual speaker position information may be stored in the memory 130.

Meanwhile, the controller 110 converts, on the basis of the position information of the virtual speaker 120', the original sound such that the sound sounds as if sound is generated at the position of the virtual speaker, and then transmits to the speaker unit 120. Specifically, the controller 110 converts the original sound into a sound source signal for each speaker by using the position information of the virtual speaker 120' (S350), and applies the converted sound source signal to each speaker of the speaker unit 120 (S360). The process of converting the original sound into the sound source signal for each speaker will be described in detail with reference to FIG. 8.

By this operation, the listening subject may feel as if the original sound is reproduced from the virtual speaker located at a position corresponding to the position of the virtual object. In addition, since the moving path of the virtual object is stored in advance and the listening subject feels such that the sound sounds as if it moves along the moving path. Therefore, it is possible to easily reproduce the sound source toward the listening subject even though the listening subject does not perform a separate operation. The listening subject of embodiment of the present invention may include the user of the electronic device 200.

Also, the sound source reproducing device 100 generates the virtual speaker position information by making reference to the position of the virtual object stored previously in the electronic device 200, so that the virtual speaker can be reproduced at a correct position of the virtual object.

FIG. 6 is a view describing the position information of the virtual speaker according to the embodiment of the present invention.

As shown in FIG. 6, the sound source which is reproduced through the plurality of speakers 120-1, 120-2, ..., 120-$n$ included in the speaker unit 120 is heard to the listening subject as if the sound source is reproduced at the position of the virtual speaker 120'. Specifically, as the position of the virtual object shown in FIG. 5 is changed (C1→C2), the position of the virtual speaker is changed in the same manner (C1→C2). The user of the electronic device 200 is able to listen to the sound source as if the sound source is reproduced at the respective positions C1 and C2 of the virtual speaker. Here, as described above, the virtual speaker positions (first position C1 (x1, y1, z1) and the second position C2 (x2, y2, z2)) included in the position information of the virtual speaker 120' can be represented by the spatial coordinate (x, y, z).

Figure 7:
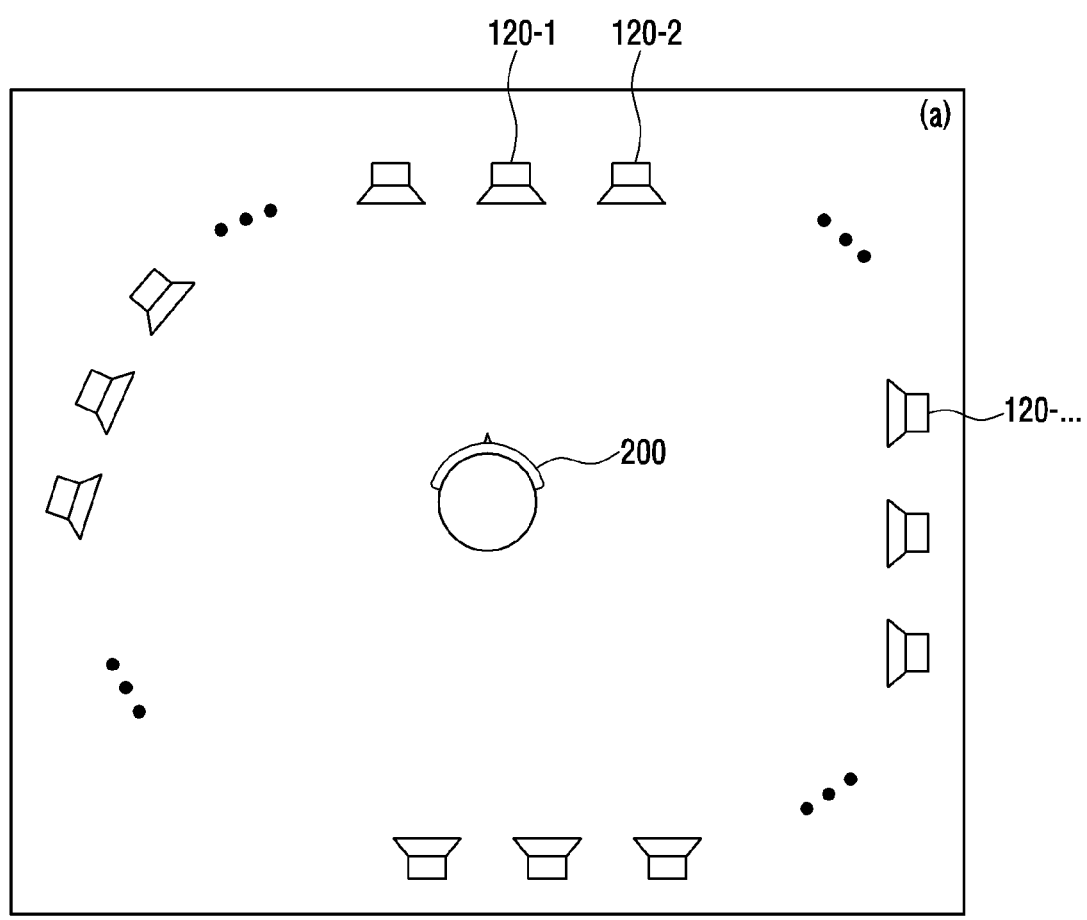

FIG. 7 is a view for describing the structure of the plurality of speakers 120-1, 120-2, ..., 120-$n$ included in the speaker unit 120 of the sound source reproducing device 100 according to the embodiment.

The plurality of speakers shown in FIG. 6 are arranged in the form of a straight bar to have a sound bar array structure. According to the embodiment, as shown in FIG. 7, the plurality of speakers may be arranged in the form of a round to have a round array structure. Also, while the embodiment of the present invention shows the sound bar array structure and the round array structure in which the speakers are arranged in the form of a round, the scope of the present invention is not limited to this. Any array structure can be applied to the implementation of the speaker module by various combinations.

In the case of the sound bar array, the speakers may be disposed on at least any one of the front, side, and rear of the user of the electronic device 200. Also, the round bar array has a structure which surrounds around the user and is implemented in the form of a round, an ellipse, etc. Through the round bar array structure, it is possible to reproduce the sound source more effectively focusing on the user than the sound bar array.

For example, when the sound bar array structure located at the front is applied, it may be difficult to reproduce virtual channel sound located on the rear of the user. However, in the case of the round bar array, the sound can be reproduced to the user in all directions. In particular, it is possible to produce an effect that the sound is reproduced without deflecting in some of all directions.

Figure 8:
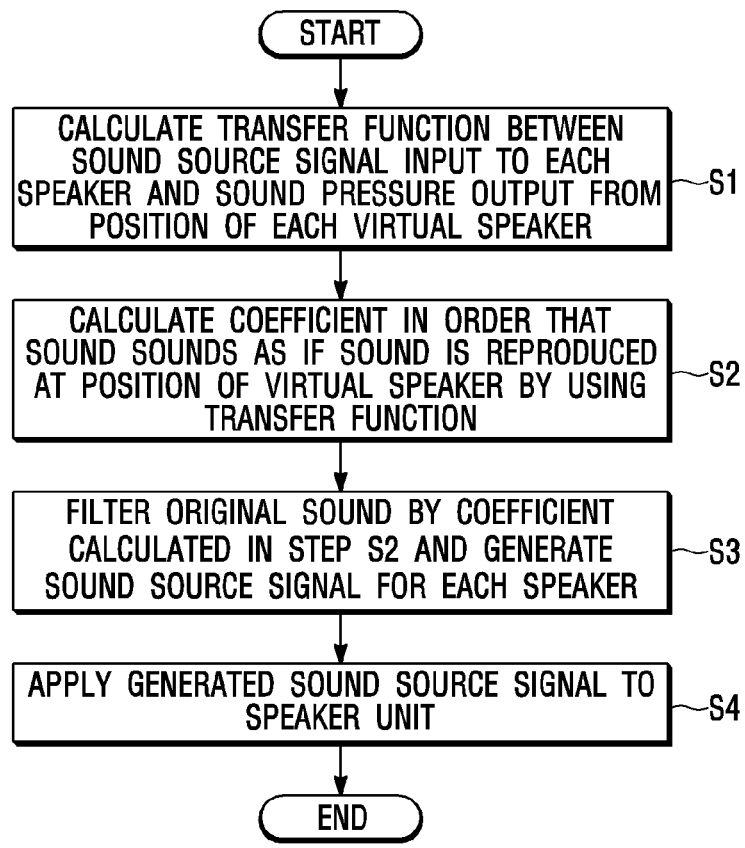
FIG. 8 is a flowchart for describing a process in which the sound source generated from the original sound received from the electronic device 200 is reproduced in virtual speaker position information.

FIG. 8 is a flowchart for describing the embodiment in which the sound source is reproduced at the position of a predetermined virtual speaker by converting the original sound that the sound source reproducing device 100 has received from the electronic device 200.

The controller 110 calculates a transfer function between the sound source signal input to each speaker of the speaker unit 120 and a sound pressure output from the position of each virtual speaker (step S1). The transfer function shows the characteristics of a space where the user is located. The transfer function may be obtained by actual measurement and be stored in the memory. The transfer function of the position of each virtual speaker may be created as many as the number of the speakers provided in the speaker unit 120 and may be represented by a function of frequency. Also, the transfer function is measured at the positions of some virtual speakers and is stored in the memory. Then, the position of the virtual speaker between the positions of some virtual speakers may be obtained by performing an interpolation operation over the transfer functions for the positions of some virtual speakers.

Next, the controller 110 calculates a coefficient for converting the original sound in order that the sound sounds as if sound is reproduced at the position of the virtual speaker by using the transfer function calculated in step S1 (step S2).

In the calculation of the coefficient, it is desirable that the coefficient should be determined such that the sound pressure level at the position of the virtual speaker is higher than the sound pressure level at a zone other than the position of the virtual speaker. More specifically, a coefficient is calculated, which maximizes a ratio of a density of a sound potential energy at the position of the virtual speaker and a sum of energies of individual sound sources. A single frequency is described herein. However, when the transfer function consists of a plurality of frequencies, it can be understood that the sound source for each frequency is determined.

The coefficient may change the magnitude and phase of the original sound. For example, the coefficient for changing the magnitude of the sound which is output from the i-th speaker of the speaker unit 120 may be a value obtained by dividing the size of the transfer function of the i-th speaker for the position of the virtual speaker by the magnitude of the transfer function vectors of all the speakers for the position of the virtual speaker. The coefficient for changing the phase difference of the audio signal input the i-th speaker may be obtained by, for example, an argument of a complex number of the transfer function of the i-th speaker.

After the coefficient is calculated, the controller 110 filters the original sound by the coefficient determined in step S2, thereby generating the sound source signal for each speaker (step S3), which is to be applied to each speaker (step S3). The generated sound source signal is applied to and reproduced in the speaker unit 120, and thus, the original sound is reproduced at the position of the virtual speaker (step S4).

The feature of the present invention has been described above in which the electronic device 200 according to the embodiment of the present invention generates and stores the image and original sound, the sound source reproducing device 100 receives, from the electronic device 200, the position information of the virtual object included in the image, so that the virtual speaker position information corresponding to the position information of the virtual object is generated, and the original sound is converted into the sound source signal for each speaker on the basis of the position information of the virtual speaker and is reproduced.

Meanwhile, according to another embodiment of the present invention, the sound source reproducing device 100 generates the image and original sound, generates the virtual speaker position information corresponding to the position information of at least any one of the virtual objects included in the image, and controls to convert the original sound into the sound source signal for each speaker on the basis of the virtual speaker position information and to reproduce it. Here, the sound source reproducing device 100 may transmit the image including the virtual object to the electronic device 200. In this case, the memory 130 of the sound source reproducing device 100 may store in advance the information on the image and sound source.

That is, according to the embodiment, the image may be transmitted from the electronic device 200 to the sound source reproducing device 100 or may be transmitted from the sound source reproducing device 100 to the electronic device 200.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

INDUSTRIAL APPLICABILITY

According to the embodiment of the present invention, the virtual speaker is reproduced depending on the position of the virtual object. Therefore, it is possible to easily reproduce the sound source toward the listening subject even though the listening subject does not perform a separate operation.

Also, through a plurality of the sound source reproducing device, it is possible to reproduce the sound source more effectively focusing on a user.

Also, the sound source reproducing device 100 generates the virtual speaker position information by making reference to the position of the virtual object stored previously in the electronic device 200, so that the virtual speaker can be reproduced at a correct position of the virtual object.

Also, since the sound source is reproduced through separate multiple speakers, inconvenience caused by wearing a head mounted display can be overcome.

The invention claimed is:

1. A sound source reproducing device which communicates with an electronic device providing images and original sound, the sound source reproducing device comprising:
an interface which receives position information of at least one virtual object included in an image and the original sound from the electronic device;
a controller which generates virtual speaker position information corresponding to the position information of the at least one virtual object received from the interface, and converts the original sound received from the interface into a sound source signal for a plurality of speakers on the basis of the virtual speaker position information; and
a memory;
wherein the image comprises a preview image based on augmented reality, and wherein the at least one virtual object, together with the preview image, is displayed on the preview image on the electronic device; and
wherein the position information of the at least one virtual object comprises moving path information on the preview image, wherein the moving path information is stored in advance in the memory, and wherein the controller generates the virtual speaker position information by making reference to the moving path information stored in advance in the memory.

2. The sound source reproducing device of claim 1, further comprising a speaker unit comprising the plurality of speakers, wherein the controller outputs the sound source signal for the plurality of speakers to the speaker unit.

3. The sound source reproducing device of claim 1, wherein the controller converts the original sound into the sound source signal which allows the original sound to sounds as if the original sound is reproduced at a position of the virtual speaker by using a transfer function between the sound source signal input to each speaker and a sound pressure output from the position of each virtual speaker.

4. The sound source reproducing device of claim 3, wherein the controller calculates a coefficient for converting the original sound in order that the original sound sounds as if the original sound is reproduced at the position of the virtual speaker by using the transfer function, and converts the original sound into the sound source signal by filtering the original sound by using the coefficient.

5. The sound source reproducing device of claim 3, wherein the transfer function for the position of at least a portion of the virtual speaker is stored in advance in the memory.

6. The sound source reproducing device of claim 1, wherein the virtual speaker position information corresponding to at least a portion of the position information of the at least one virtual object is stored in the memory.

7. The sound source reproducing device of claim 1, wherein the electronic device is a head mounted display.

8. A sound source reproducing device which communicates with an electronic device, the sound source reproducing device comprising:
a memory which stores original sound and images including at least one virtual object; and
a controller which generates virtual speaker position information corresponding to position information of the at least one virtual object, and converts the original sound into a sound source signal for a plurality of speakers on the basis of the virtual speaker position information,
wherein the controller transmits an image including the at least one virtual object to the electronic device;
wherein the image comprises a preview image based on augmented reality, and wherein the at least one virtual object, together with the preview image, is displayed on the preview image on the electronic device; and
wherein the position information of the at least one virtual object comprises moving path information on the preview image, wherein the moving path information is stored in advance in the memory, and wherein the controller generates the virtual speaker position information by making reference to the moving path information stored in advance in the memory.

9. The sound source reproducing device of claim 8, further comprising a speaker unit comprising the plurality of speakers, wherein the controller outputs the sound source signal for the plurality of speakers to the speaker unit.

10. The sound source reproducing device of claim 8, wherein the controller converts the original sound into the sound source signal which allows the original sound to sounds as if the original sound is reproduced at a position of the virtual speaker by using a transfer function between the sound source signal input to each speaker and a sound pressure output from the position of each virtual speaker.

11. The sound source reproducing device of claim 10, wherein the controller calculates a coefficient for converting the original sound in order that the original sound sounds as if the original sound is reproduced at the position of the virtual speaker by using the transfer function, and converts the original sound into the sound source signal by filtering the original sound by using the coefficient.

12. The sound source reproducing device of claim 10, wherein the transfer function for the position of at least a portion of the virtual speaker is stored in advance in the memory.

13. The sound source reproducing device of claim 8, wherein the virtual speaker position information corresponding to at least a portion of the position information of the at least one virtual object is stored in the memory.

14. The sound source reproducing device of claim 8, wherein the electronic device is a head mounted display.

* * * * *

UNITED STATES PATENT AND TRADEMARK OFFICE
CERTIFICATE OF CORRECTION

PATENT NO. : 10,964,115 B2
APPLICATION NO. : 16/500943
DATED : March 30, 2021
INVENTOR(S) : Yang-Hann Kim et al.

It is certified that error appears in the above-identified patent and that said Letters Patent is hereby corrected as shown below:

On the Title Page

Item (12) should read -- Kim et al. --

Item (72), under the "Inventors" section, and beneath "KIM, Yang-Hann, Yuseong, Daejeon (KR)", add the following inventors:
-- "LEE, Jong-Hwa, Yuseong-gu, Daejeon (KR);
PARK, Joon-Young, Songpa-gu, Seoul (KR);
KIM, Wan-Jung, Yuseong-gu, Daejeon (KR);
KIM, Hwan, Yongsan-gu, Seoul (KR)" --

Signed and Sealed this
Twentieth Day of September, 2022

Katherine Kelly Vidal
*Director of the United States Patent and Trademark Office*